United States Patent
Wolff et al.

(10) Patent No.: US 6,598,944 B1
(45) Date of Patent: Jul. 29, 2003

(54) ELECTROMAGNETIC DEVICE, ESPECIALLY FOR AN ANTI-SLIP, HYDRAULIC VEHICLE BRAKE SYSTEM

(75) Inventors: Guenter Wolff, Schwieberdingen (DE); Friedrich Megerle, Asperg (DE); Martin Oehler, Weinsberg (DE); Dirk Hofmann, Ludwigsburg (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/830,648
(22) PCT Filed: Jun. 12, 1999
(86) PCT No.: PCT/DE99/01726
§ 371 (c)(1), (2), (4) Date: Dec. 7, 2001
(87) PCT Pub. No.: WO00/24620
PCT Pub. Date: May 4, 2000

(30) Foreign Application Priority Data

Oct. 28, 1998 (DE) .......................... 198 49 667

(51) Int. Cl.$^7$ ........................... B60T 8/36; F16K 31/06
(52) U.S. Cl. ................................. 303/119.2
(58) Field of Search .......................... 303/116.1–116.2, 303/119.1, 119.2; 251/129.02, 129.15

(56) References Cited

U.S. PATENT DOCUMENTS 6,113,066 A * 9/2000 Hohl et al. ............ 251/129.02

* cited by examiner

Primary Examiner—Christopher P. Schwartz
(74) Attorney, Agent, or Firm—Ronald E. Greigg

(57) ABSTRACT

The invention relates to an electromagnetic device, in particular for a slip-controlled, hydraulic vehicle brake system, having at least a first magnet valve which is closed in its currentless basic position and having at least a second magnet valve which is open in its currentless basic position, the first and second magnet valves being received in receiving bores of a valve block. The invention provides that the first and second magnet valves have structurally identical, one-piece valve housings, in each of which all the magnet valve components are received essentially without any axial protrusion, and that the total length of each of the first and second magnet valves is recessed in the receiving bores of the valve block, and that a nonferromagnetic spacer ring is disposed between a face end, pointing toward the valve seat, of at least one magnet coil and a dividing plane between this magnet coil and the associated pole piece.

20 Claims, 2 Drawing Sheets

ELECTROMAGNETIC DEVICE, ESPECIALLY FOR AN ANTI-SLIP, HYDRAULIC VEHICLE BRAKE SYSTEM

PRIOR ART

The invention is based on an electromagnetic device, in particular for a slip-controlled, hydraulic vehicle brake system, as generically defined by the preamble to claim 1.

One such device is known from European Patent Disclosure EP 0 675 030 A2. A valve block used there has a plurality of receiving bores, in which first magnet valves, which are closed in the currentless basic position, and second magnet valves, which are open in the currentless basic position, are received on valve carriers. The first and second magnet valves each have a hydraulic part, with a valve closing member that is controlled by a magnet armature and is movable relative both to a valve seat body, retained by a valve seat carrier, and to a pole piece, and an electrical part, with a magnet coil, which in the electrically excited state cooperates with the magnet armature in such a way that the first magnet valve is opened and the second magnet valve is closed.

For receiving the first and second magnet valves in the receiving bores of the known valve block, a retaining plate is provided, which keeps the respective valve carrier in the receiving bore and is screwed to the valve block. The retaining plate has through bores, through which guide sleeves of the magnet valves protrude. A magnet coil is placed on the respective part of a guide sleeve protruding from the retaining plate and surrounds it. The magnet coil is embraced by a yoke.

In a guide sleeve, a pole piece, a valve spring, and a magnet armature with a closing body of a seat valve are all received. The guide sleeve comprises a nonferromagnetic material and is widened at the end into a flange, which on the face end rests on a valve seat carrier and over which the valve carrier fits. The valve carrier and the valve seat carrier are joined together by a crimped connection.

The known device has the disadvantage that the magnet valves cannot be inserted as completely preassembled structural units into the receiving bores, since first the guide sleeve together with the valve carrier and the valve seat carrier must be fixed in the receiving bore by means of the retaining plate, and only then must the magnet coil be placed on the guide sleeve together with the yoke.

Furthermore, the first and second magnet valves are relatively long and protrude out of the receiving bores of the valve block, and as a result the control unit of the known electromagnetic device, which carries the valve block, is relatively tall. Furthermore, the installation depth and hence the installation rigidity of the guide sleeves, which protrude far out of the receiving bores and absorb the dynamic forces resulting from the motion of the magnet armature, are slight.

Finally, the guide sleeve is of nonferromagnetic material and is disposed within the primary magnetic flux. This has the disadvantage that the guide sleeve represents a high magnetic resistance, which thus weakens the magnetic flux.

ADVANTAGES OF THE INVENTION

The electromagnetic device of the invention having the characteristics of claim 1 has the advantage over the prior art that because of the one-piece valve housing, which surrounds all the magnet valve components, the first and second magnet valves can each be inserted as completely preassembled units into the receiving bores. This also lends high intrinsic rigidity to the magnet valves, which is especially advantageous whenever they are wedged in the receiving bores by major exertion of force and the high intrinsic rigidity prevents the preset valve play from changing as a result of relative motions of magnet valve components to one another and prevents the magnet armature from wedging in its guide. Since for both types of magnet valve, those that are open without current and closed without current, the same one-piece valve housing is used, the number of different components is reduced, which has a favorable effect on the production costs.

Further advantages will become apparent from the countersunk arrangement of magnet valves in the receiving bores of the valve block. The result on the one hand is greater installed rigidity of the magnet valves in the receiving bores, and on the other, the result is also that the heat-producing magnet coils are disposed in countersunk fashion, and the heat dissipation can take place through the valve block. Because of this provision, heat-sensitive electronic control components can be disposed in direction end-to-end contact with the countersunk magnet valves, which reduces the structural size of the control unit of the device.

Finally, the nonferromagnetic spacer ring has an advantageous dual function. First, it seals off the hydraulic part of the magnet valves, which is acted upon by pressure medium and contains the magnet armature, the valve closing member, the valve seat carrier, and the pole piece, from the electrical part having the magnet coil. Second, by its arrangement between the face end of the magnet coil toward the valve seat and the dividing plane between this magnet coil and the associated pole piece, it is not located inside the primary magnetic field, and thus its magnetic resistance exerted on the magnetic field is correspondingly slight. In addition, the nonferromagnetic spacer ring does not short-circuit the magnetic field lines to the valve housing, but instead assures that these field lines can penetrate the magnet armature of the first magnet valve and the pole disk of the second magnet valve.

By combining these provisions, the result overall is a very rigid, short design of the first and second magnet valves, and as a result the control unit of the electromagnetic device is small in size. Moreover, the magnet valves comprise only a few components.

By means of the provisions recited in the dependent claims, advantageous refinements of and improvements to the electromagnetic device defined by claim are possible.

It is especially advantageous that the valve seat bodies of the first and second magnet valves are embodied structurally identically and each in one piece with the valve seat. This further reduces the number of different components.

An especially preferred refinement of the invention provides that a first nonferromagnetic spacer ring is disposed in the radial direction between the valve housing and the pole core; this ring protrudes axially past an end face, pointing toward the first magnet armature, of the pole core with an annular portion on its face end, on which portion the first magnet armature rests when the first magnet valve is opened. As a result, a remanent air gap between the pole piece and the magnet armature is assured, which prevents magnetic adhesion of the magnet armature to the pole piece.

DRAWINGS

Exemplary embodiments of the invention are shown in the drawings and described in further detail in the ensuing description.

DESCRIPTION OF THE EXEMPLARY EMBODIMENTS

Figure 1:
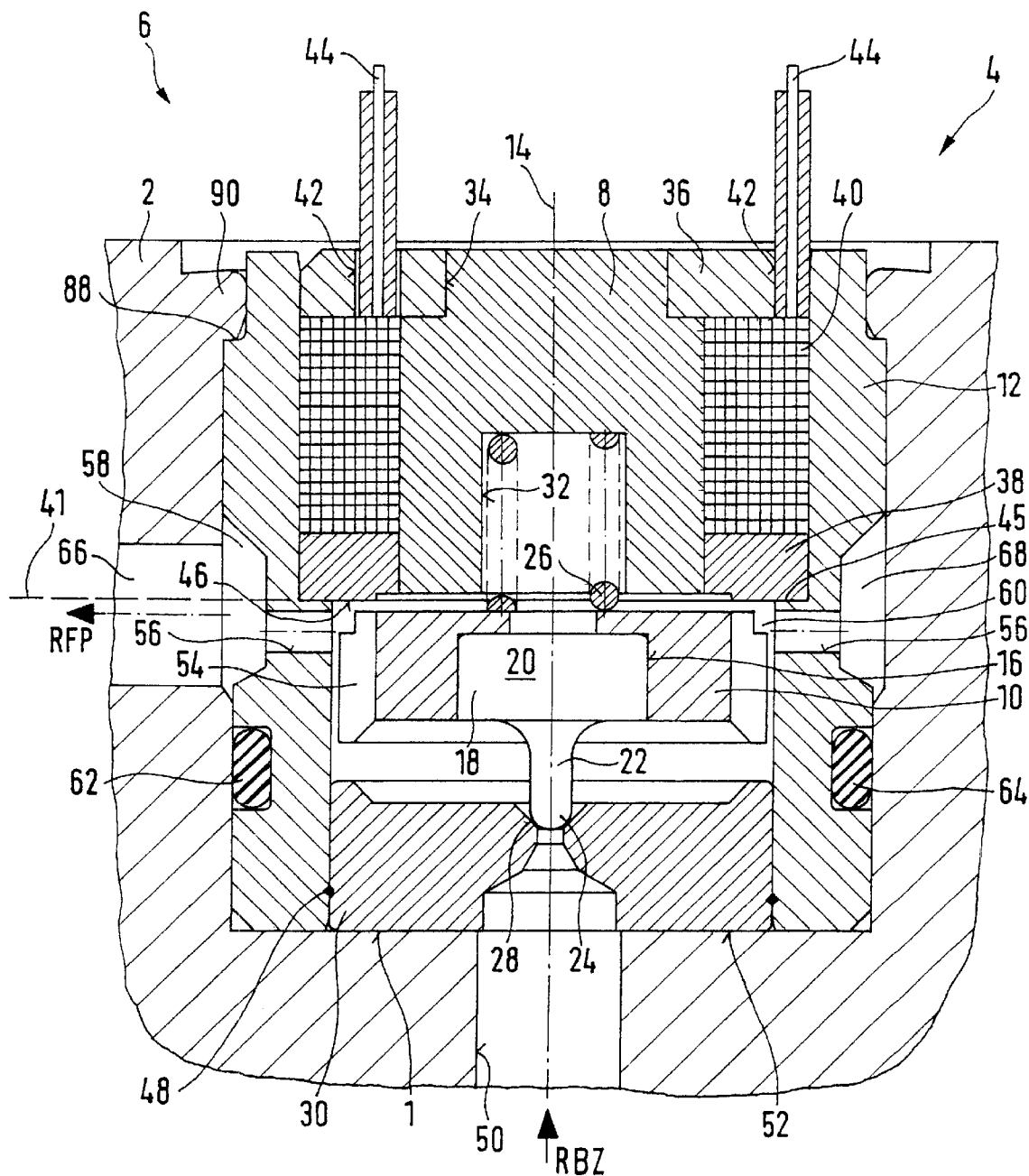
FIG. 1 shows a longitudinal section through a first magnet valve, which is closed in the currentless basic position, of an electromagnetic device of the invention.

The first magnet valve 4, shown in FIG. 1 in a first receiving bore 1 of a valve block 2, forms part of a control unit, not otherwise shown, of a preferred embodiment of an electromagnetic device 6 of the invention, for use in slip-controlled motor vehicle brake systems. The first magnet valve 4 is a 2/2-way outlet valve, which in its currentless basic position blocks the return of brake fluid, for instance from a wheel brake cylinder RBZ to a return pump RFP.

The first magnet valve 4 on its top has a pole core 8, which in the axial direction with only slight axial spacing adjoins a first magnet armature 10 whose height is small compared to its diameter. The first magnet armature 10 is guided movably by a one-piece valve housing 12 along a magnet valve axis 14 and has a central stepped bore 16, into which the cylindrical base 18 of a first valve closing member 20 is inserted. Protruding away from the base 18 of the first valve closing member 20 is a first sealing tappet 22, pointing away from the pole core 8, and the first closing body 24, on the end of the sealing tappet, is embodied hemispherically. The first closing body 24 is pressed by the pressure of a first valve spring 26, which is braced between the pole core 8 and the first magnet armature 10, into a hollow-conical valve seat 28, which is embodied integrally with a valve seat plate 30 on the bottom. The first magnet valve 4 is then in its basic position that is closed when currentless. The first valve spring 26 is preferably a helical spring, which is countersunk in a blind bore 32 in the pole core 8. To prevent magnetic adhesion between the first magnet armature 10 and the valve housing 12, the radially outer circumferential surface of the first magnet armature 12 is provided with a nonferromagnetic coating, preferably a layer of chromium. The first magnet armature 10 together with the pole core 8 forms the first valve closing member 20 and the valve seat plate 30 of a hydraulic part of the first magnet valve 4.

On its top end, the pole core 8 has a radially outer annular shoulder 34, which is engaged by a first cover disk 36, and embraced on its end pointing toward the first magnet armature 10 by a first, nonferromagnetic spacer ring 38. A first magnet coil 40 is disposed axially between the first, nonferromagnetic spacer ring 38 and the first cover disk 36 and radially between the valve housing 12 and the pole core 8. The first, nonferromagnetic spacer ring 38 is also disposed between a face end, pointing toward the valve seat 28, of the first magnet coil 40 and a dividing plane 41 between the first magnet coil 40 and the pole core 8.

The first cover disk 36 has two axial through bores 42, through which terminals 44 of the first magnet coil 40 extend axially. The first, nonferromagnetic spacer ring 38 is connected to the lower face end of the first magnet coil 40 and to a radially inner shoulder 45 of the valve housing 12. It is also disposed radially between the valve housing 12 and the pole core 8. The first magnet coil 40, the first cover disk 36, and the terminals 44 of the first magnet coil 40 together form an electrical part of the first magnet valve 4.

The hydraulic part and the electrical part and thus all the components of the first magnet valve 4 are entirely surrounded radially by the one-piece valve housing 12. The first, nonferromagnetic spacer ring 38 has an annular portion 46 on the face end, which portion axial protrudes past an end face, pointing toward the first magnet armature 10, of the pole core 8 and is preferably located in the dividing plane 41. The first magnet armature 10 rests on this annular portion 46, in the open position. This creates a remanent air gap between the pole core 8 and the first magnet armature 10, and this gap prevents magnetic adhesion of the first magnet armature 10 to the pole core 8.

The first, nonferromagnetic spacer ring 38 is connected on its radially inner circumferential surface to the pole core 8 and on its radially outer circumferential surface to the valve housing 12, for instance by hard soldering, and thus seals off the electrical part of the first magnet valve 4 from its hydraulic part. On the other hand, because of its face-end disposition on the first magnet coil 40, it is not located in the primary field of the magnetic flux, and as a result its magnetic resistance acting on the magnetic field is correspondingly slight. Preferably the first, nonferromagnetic spacer ring 38 is paramagnetic or diamagnetic. Since the first, nonferromagnetic spacer ring 38 does not deflect the magnetic field lines, it assures that these lines can penetrate the first magnet armature 10 without causing a magnetic short circuit between the pole core 8 and the valve housing 12.

The valve seat plate 30 is press-fitted on the bottom into the valve housing 12, and as a result the valve stroke is adjustable. In addition, the valve seat plate 30 is connected to the valve housing 12 by an encompassing laser- welded seam 48, shown in FIG. 1 as a diamond. The height of the valve seat plate 30 is small compared to its diameter. The valve seat 28 embodied in the valve seat plate is widened in diameter at its end and communicates with an inlet conduit 50 in the valve block 2 that opens into the bottom 52 of the first receiving bore 1.

When the first magnet coil 40 is electrically excited, a magnetic force is exerted on the axially movable first magnet armature 10 toward the pole core 8, and as a result the first magnet armature 10 moves counter to the spring force of the first valve spring and lifts the first closing body 24 from the valve seat 28. The magnetic circuit is then closed from the pole core 8 via the first magnet armature 10, the valve housing 12 and the first cover disk 36, and as a result the first magnet valve 4 is in the open position, and brake fluid can flow from the inlet conduit 50 through the valve seat 28, or in the reverse direction.

The first magnet armature 10, on its radially outer circumferential surface, has axial grooves 54, through which the brake fluid, passing through the valve seat 28, flows to two transverse bores 56 in the valve housing 12, which open out into the bottom of a first annular recess 58 formed in the outer circumferential wall of the valve housing 12. In addition, on its end toward the pole core 8, the first magnet armature 10 has an annular shoulder 60 that forms an annular conduit, through which brake fluid can flow when it rests on the annular portion 46 of the first, nonferromagnetic spacer ring 38. The annular shoulder 60 makes a flow cross section available, if the grooves 54 of the first magnet armature 10 and the transverse bores 56 in the valve housing 12 are offset from one another.

The transverse bores 56 are located essentially in the same transverse plane as the end face, toward the pole core, of the first magnet armature 10 when the first magnet valve 4 is closed. This provision likewise contributes to a short structure of the first magnet valve 4, since in such transverse bores 56, disposed with vertical spacing from the bottom 52 of the first receiving bore 1, the structural length of the valve housing 12 remaining below the transverse bores suffices to accommodate a second, outer annular recess 62, in which an O-ring 64 seals off the two conduits 50 and 66 from one another.

Between the first annular recess 58 of the valve housing 12 and the radially inner circumferential wall of the first receiving bore 1, an annular chamber 68 is formed, through which the brake fluid flows to the outlet conduit 66, which opens into the circumferential wall of the first receiving bore 1 and is disposed transversely to the magnet valve axis 14. The flow of brake fluid in the open position of the first magnet valve 4 therefore takes place from the inlet conduit 50 through the valve seat 28, axial grooves 54 and annular shoulder 60 of the first magnet armature 10, through the transverse bores 56 in the valve housing 12, through the annular chamber 68, and finally from there into the outlet conduit 66. Alternatively, the direction of flow through the first magnet valve 4 can be the opposite of this.

Figure 2:
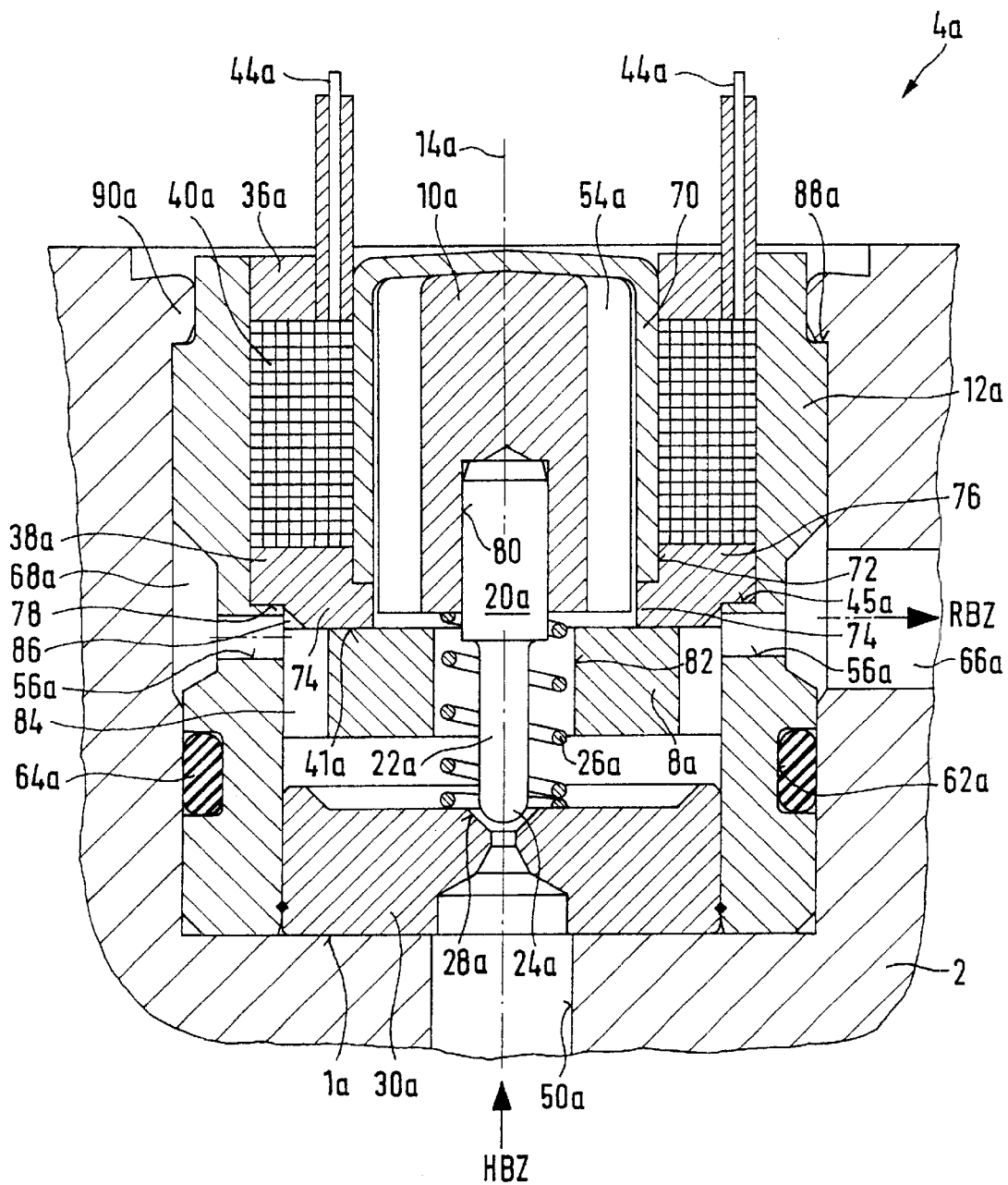
FIG. 2 shows a longitudinal section through a second magnet valve, which is open in the currentless basic position, of an electromagnetic device of the invention.

In FIG. 2, a second magnet valve 4a, which is open in the currentless basic position, is shown in a second receiving bore 1a of the valve block 2. The second magnet valve 4a is a 2/2-way inlet valve, which in the open basic position makes the flow of brake fluid possible, for instance from a master cylinder HBZ to a wheel brake cylinder RBZ.

The second magnet valve 4a on its top has a guide sleeve 70, open at the bottom and surrounded by a valve housing 12a, and in this guide sleeve a second magnet armature 10a is guided axially movably. The guide sleeve 70 is of ferromagnetic material with only slight magnetic resistance. The second magnet armature 10a likewise has a nonferromagnetic coating, preferably of chromium, to avoid magnetic adhesion at the guide sleeve 70.

The guide sleeve 70, with its open end, engages a radially inner annular shoulder 72 of a second, nonferromagnetic spacer ring 38a, whose end portion 74 forms an axial guidance extension of the guide sleeve 70. A second magnet coil 40a is disposed axially between a second cover disk 36a, radially embracing the guide sleeve 70, and the second, nonferromagnetic spacer ring 38a and is disposed radially between the valve housing 12a and an initial portion 76, which includes the annular shoulder 72, of the second, nonferromagnetic spacer ring 38a. The second, nonferromagnetic spacer ring 38a furthermore has a radially outer shoulder 78, which is received in a complimentary, radially inner shoulder 45a of the valve housing 12a. The second, nonferromagnetic spacer ring 38a is also disposed between a face end, pointing toward the valve seat 28a, of the second magnet coil 40a and a dividing plane 41a between the second magnet coil 40a and a pole disk 8a. The second cover disk 36a is press-fitted between the guide sleeve 70 and the valve housing 12a.

The second magnet armature 10a has a second valve closing member 20a, embodied as a sealing tappet 22a, which with one end is inserted into a terminal blind bore 80 of the second magnet armature 10a and is provided on its free end with a second, hemispherical closing body 24a. The second sealing tappet 22a protrudes through a central through opening 82 of the pole disk 8a, which is press-fitted into the valve housing 12a and is preferably in contact in the dividing plane 41 with the second, nonferromagnetic spacer ring 38a.

The second, hemispherical closing body 24a, in the open basic position of the second magnet valve 4a, is located opposite the hollow-conical valve seat 28a with axial spacing between them; this valve seat is embodied integrally with a valve seat plate 30a that forms the bottom of the second magnet valve 4a. The valve housing 12a and the valve seat plate 30a of the second magnet valve 4a are structurally identical to the valve housing 12 and the valve seat plate 30 of the first magnet valve 4, respectively. Furthermore, the second receiving bore 1a is also identical to the first receiving bore 1.

A second valve spring 26a is braced by one end on the face end, toward the pole disk, of the second magnet armature 10a and with its other end, protruding through the central through opening 82 of the pole disk 8a, is braced on the valve seat plate 30a and presses the second magnet armature 10a into the open position, away from the valve seat plate 30a. Brake fluid originating in the inlet conduit 50a in the valve block 2 can then flow through the valve seat 28a and through the central through opening 82 of the pole disk 8a, or through two radially outer, axially extending grooves 84 of the pole disk 8a, to two transverse bores 56a in the valve housing 12a. The outflow takes place via an annular chamber 68a and an outlet conduit 66a into the second receiving bore 1a. By means of an O-ring 64a, disposed in a second, outer annular recess 62a of the valve housing 12a, the inlet and outlet conduits 50a, 66a are hydraulically separated from one another.

A radially outer part of the end face, pointing toward the second magnet armature 10a, of the pole disk 8a is located substantially in the same transverse plane as the center axes of the two transverse bores 56a in the valve housing 12a. So that the flow cross section for the brake fluid emerging from the axial grooves 84 of the pole disk 8a will not be reduced by the second, nonferromagnetic spacer ring 38a, this spacer ring, on its radially outer, lower edge, has an annular recess 86 of triangular cross section. To enable a pressure equalization during the axial motion of the second magnet armature 10a inside the guide sleeve 70, this armature likewise has axially extending grooves 54a on its radially outer circumference.

Analogously to the first magnet valve 4, the second, nonferromagnetic spacer ring 38a also seals off the electrical part of the second magnet valve 4a, which comprises the second cover disk 36a, the second magnet coil 40a, and its terminals 44a, from the hydraulic part of the second magnet valve 4a, through which brake fluid flows, and which includes the guide sleeve 70, the second magnet armature 10a, the second valve closing member 20a, the pole disk 8a, and the valve seat plate 30a. To that end, the second, nonferromagnetic spacer ring 38a is connected to the valve housing 12a and the guide sleeve 70, in each case by hard soldering, for instance.

Since the second, nonferromagnetic spacer ring 38a is disposed between the face end, pointing toward the valve seat 28a, of the second magnet coil 40a and the dividing plane 41a between the second magnet coil 40a and the pole disk 8a, it acts upon the distribution of magnetic field lines analogously to the first, nonferromagnetic spacer ring 38. In particular, it assures a magnetic penetration of the pole disk 8a, without causing a magnetic short circuit between the second magnet armature 10a and the valve housing 12a.

When the second magnet coil 40a is excited, a magnetic force is exerted on the axially movable, second magnet armature 10a toward the pole disk 8a, and as a result the second magnet armature 10a moves counter to the spring force of the second valve spring 26a and presses the second closing body 24a into the valve seat 28a. The magnetic circuit is then closed from the second magnet armature 10a via the pole disk 8a, the valve housing 12a, the second cover disk 36a, and the guide sleeve 70; the second magnet valve 4a is in the closed position. The second sealing tappet 22a is long enough that in the closed valve position, the second magnet armature 10a still has a slight axial spacing from the pole disk 8a.

As FIGS. 1 and 2 show, the entire length of the first and second magnet valves 4, 4a is received in the respective first and second receiving bores 1, 1a, and in each case only the terminals 44, 44a of the first and second magnet coils 40, 40a protrude out of the receiving bores 1, 1a. The first and second magnet valves 4, 4a are wedged in the receiving bores 1, 1a, because material is positively displaced from the entire edge of the bore of each receiving bore 1, 1a toward a radially outer shoulder 88, 88a on the end of the valve housing 12, 12a. In each case this creates a bead 90, 90a of material that covers the respective shoulder 88, 88a of the valve housing 12, 12a and that fixes the first and second magnet valves 4, 4a in the receiving bores 1, 1a. In addition, the wedging causes the annular chamber 68, 68a, through which brake fluid flows, to the sealed off from the top of the magnet valve in pressuretight and fluidtight fashion, without additional seals.

The first and second magnet coils 40, 40a each have a high number of turns a relatively small diameter, so that a high magnetic field intensity occurs with simultaneously only slight heating. Furthermore, in the region of the magnet coils 40, 40a, in a plane that is transverse to the magnet valve axis 14, 14a, the iron cross sections are approximately the same size as the coil cross sections, so that magnetic saturation effects do not occur in either of the magnet armatures 10, 10a.

What is claimed is:

1. In an electromagnetic device (6), having at least one first magnet valve (4), which is closed in its currentless basic position, and having at least one second magnet valve (4a), which is open in its currentless basic position, the first and second magnet valves (4, 4a) having a valve housing (12, 12a) and being received in receiving bores (1, 1a) of a valve block (2) and each having one valve closing member (20, 20a) controlled by a magnet armature (10, 10a), which member is movable relative to a valve seat (28, 28a), carried by a valve seat carrier (30, 30a), and to a pole piece (8, 8a), and one magnet coil (40, 40a) each, which in the electrically excited state cooperates with the magnet armature (10, 10a) in such a way that the first magnet valve (4) is opened and the second magnet valve (4a) is closed, the improvement wherein the first and second magnet valves (4, 4a) have structurally identical, one-piece valve housings (12, 12a), in each of which all the magnet valve components are received essentially without any axial protrusion, and that the total length of each of the first and second magnet valves (4, 4a) is recessed in the receiving bores (1, 1a) of the valve block (2), and that a nonferromagnetic spacer ring (38, 38a) is disposed between a face end, pointing toward the valve seat (28, 28a), of at least one magnet coil (40, 40a) and a dividing plane (41, 41a), which extends between the pole piece (8, 8a) and the magnet armature (10, 10a) of the first and second magnet valve (4, 41).

2. The electromagnetic device of claim 1, wherein the first magnet valve (4) on its top has a pole core (8), which is adjoined with axial spacing by a first magnet armature (10), guided axially movably by the valve housing (12), which armature, on its face end pointing away from the pole core (8) has a first valve closing member (20), embodied as a sealing tappet, which is pressed into the valve seat (28) by the pressure of a first valve spring (26), braced between the pole core (8) and the first magnet armature (10), when the first magnet valve (4) is closed.

3. The electromagnetic device of claim 2, wherein a first magnet coil (40) is disposed axially between a first cover disk (36), engaging a radially outer annular shoulder (34) of the pole core (8), and the first, nonferromagnetic spacer ring (38) and is disposed radially between the valve housing (12) and the pole core (8).

4. The electromagnetic device of claim 3, wherein upon electrical excitation of the first magnet coil (40), the magnetic circuit is closed from the pole core (8) via the first magnet armature (10), the valve housing (12), and the first cover disk (36).

5. The electromagnetic device of claim 4, wherein the second magnet valve (4a) on its top has a guide sleeve (70), which is enclosed by the valve housing (12a) and open at the bottom and in which a second magnet armature (10a) is guided axially movably.

6. The electromagnetic device of claim 3, wherein the second magnet valve (4a) on its top has a guide sleeve (70), which is enclosed by the valve housing (12a) and open at the bottom and in which a second magnet armature (10a) is guided axially movably.

7. The electromagnetic device of claim 2, wherein a first nonferromagnetic spacer ring (38) is disposed radially between the valve housing (12) and the pole core (8), which ring protrudes axially past an end face, pointing toward the first magnet armature (10), of the pole core (8) with an annular portion (46), on which the first magnet armature (10) rests when the first magnet valve (4) is opened.

8. The electromagnetic device of claim 7, wherein a first magnet coil (40) is disposed axially between a first cover disk (36), engaging a radially outer annular shoulder (34) of the pole core (8), and the first, nonferromagnetic spacer ring (38) and is disposed radially between the valve housing (12) and the pole core (8).

9. The electromagnetic device of claim 8, wherein upon electrical excitation of the first magnet coil (40), the magnetic circuit is closed from the pole core (8) via the first magnet armature (10), the valve housing (12), and the first cover disk (36).

10. The electromagnetic device of claim 7, wherein the second magnet valve (4a) on its top has a guide sleeve (70), which is enclosed by the valve housing (12a) and open at the bottom and in which a second magnet armature (10a) is guided axially movably.

11. The electromagnetic device of claim 2, wherein the second magnet valve (4a) on its top has a guide sleeve (70), which is enclosed by the valve housing (12a) and open at the bottom and in which a second magnet armature (10a) is guided axially movably.

12. The electromagnetic device of claim 1, wherein the second magnet valve (4a) on its top has a guide sleeve (70), which is enclosed by the valve housing (12a) and open at the bottom and in which a second magnet armature (10a) is guided axially movably.

13. The electromagnetic device of claim 12, wherein the guide sleeve (70), with its open end, engages a radially inner annular shoulder (72) of a second, nonferromagnetic spacer ring (38a), whose end portion (74) forms an axial guidance extension of the guide sleeve (70).

14. The electromagnetic device of claim 13, wherein a second magnet coil (40a) is disposed axially between a cover disk (36a), located on the top of the magnet coil and radially embracing the guide sleeve (70), and the second, nonferromagnetic spacer ring (38a), and is disposed radially between the valve housing (12) and an initial portion (76), including the annular shoulder (72) of the guide sleeve (70).

15. The electromagnetic device of claim 14, wherein a pole disk (8a), provided with a central through opening (82), adjoins the second, nonferromagnetic spacer ring (38*a*) in the axial direction and is press-fitted into the valve housing (12*a*).

16. The electromagnetic device of claim 15, wherein the second magnet armature (10*a*) carries a second valve closing member (20*a*), which is embodied as a sealing tappet and extends through the central through opening (82) of the pole disk (8*a*) as far as the valve seat (28*a*).

17. The electromagnetic device of claim 16, wherein the second valve closing member (20*a*) is long enough that the second magnet armature (10*a*) maintains a slight axial spacing from the pole disk (8*a*) when the second magnet valve (4*a*) is closed.

18. The electromagnetic device of claim 14, wherein upon electrical excitation of the second magnet coil (40*a*), the magnetic circuit from the second magnet armature (10*a*) is closed via the pole disk (8*a*), the valve housing (12), the second cover disk (36*a*), and the guide sleeve (70).

19. The electromagnetic device of claim 1, wherein the valve seat bodies (30, 30*a*) of the first and second magnet valves (4, 4*a*) are embodied structurally identically and are each embodied integrally with the valve seat (28, 28*a*).

20. The electromagnetic device of claim 1, wherein the valve housing (12, 12*a*) of the first and second magnet valves (4, 4*a*) are wedged in pressuretight and fluidtight fashion in the receiving bores (1, 1*a*).

* * * * *